March 19, 1968  A. R. GILES  3,373,489
POWER DRIVEN PRUNING SAWS
Original Filed May 10, 1965  3 Sheets-Sheet 1
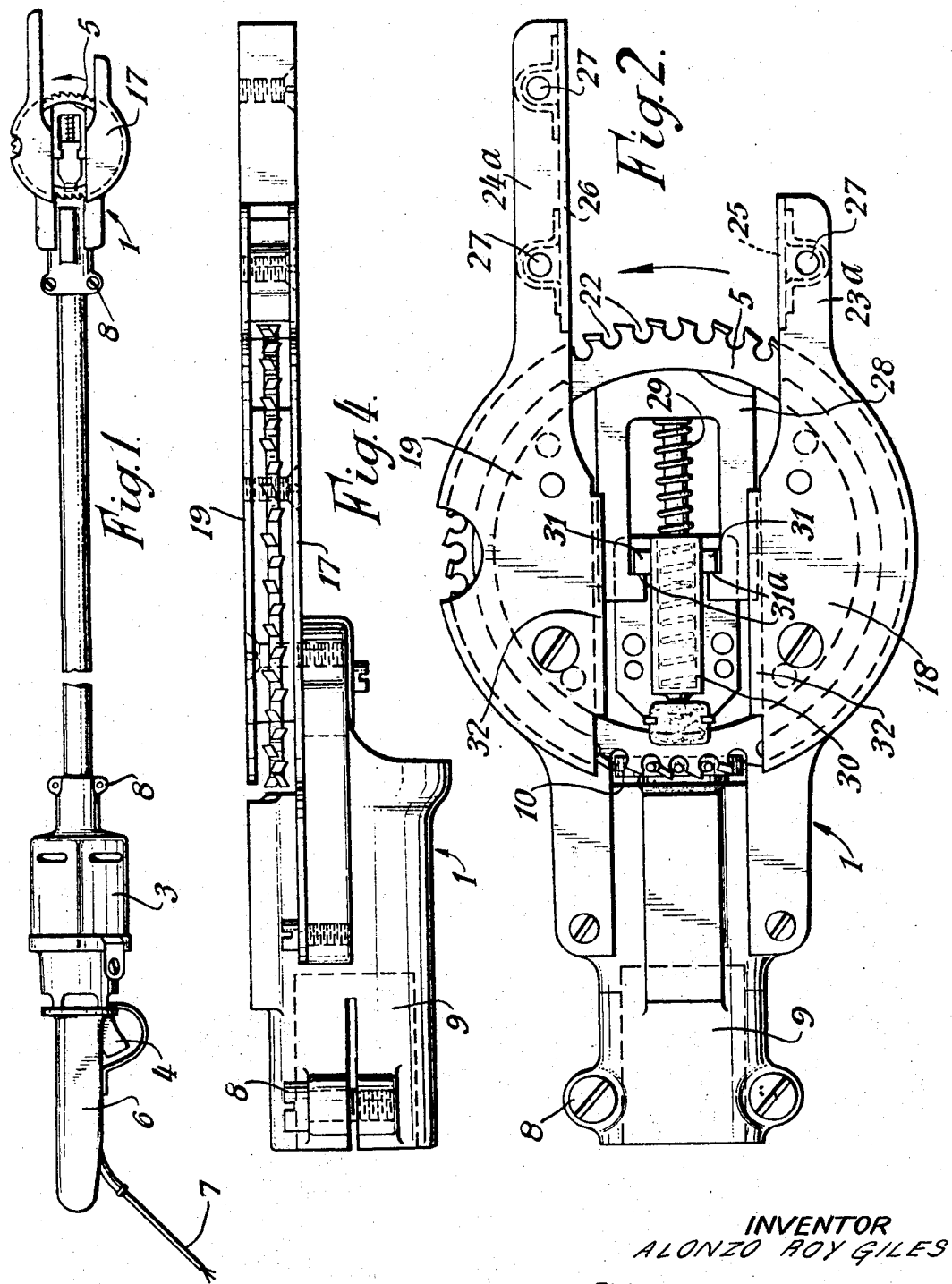
INVENTOR
ALONZO ROY GILES
BY
OSTROLENK, FABER, GERB & SOFFEN
ATTORNEYS March 19, 1968     A. R. GILES     3,373,489

POWER DRIVEN PRUNING SAWS

Original Filed May 10, 1965     3 Sheets-Sheet 2

INVENTOR
ALONZO ROY GILES

BY
OSTROLENK, FABER, GERB & SOFFEN

ATTORNEYS

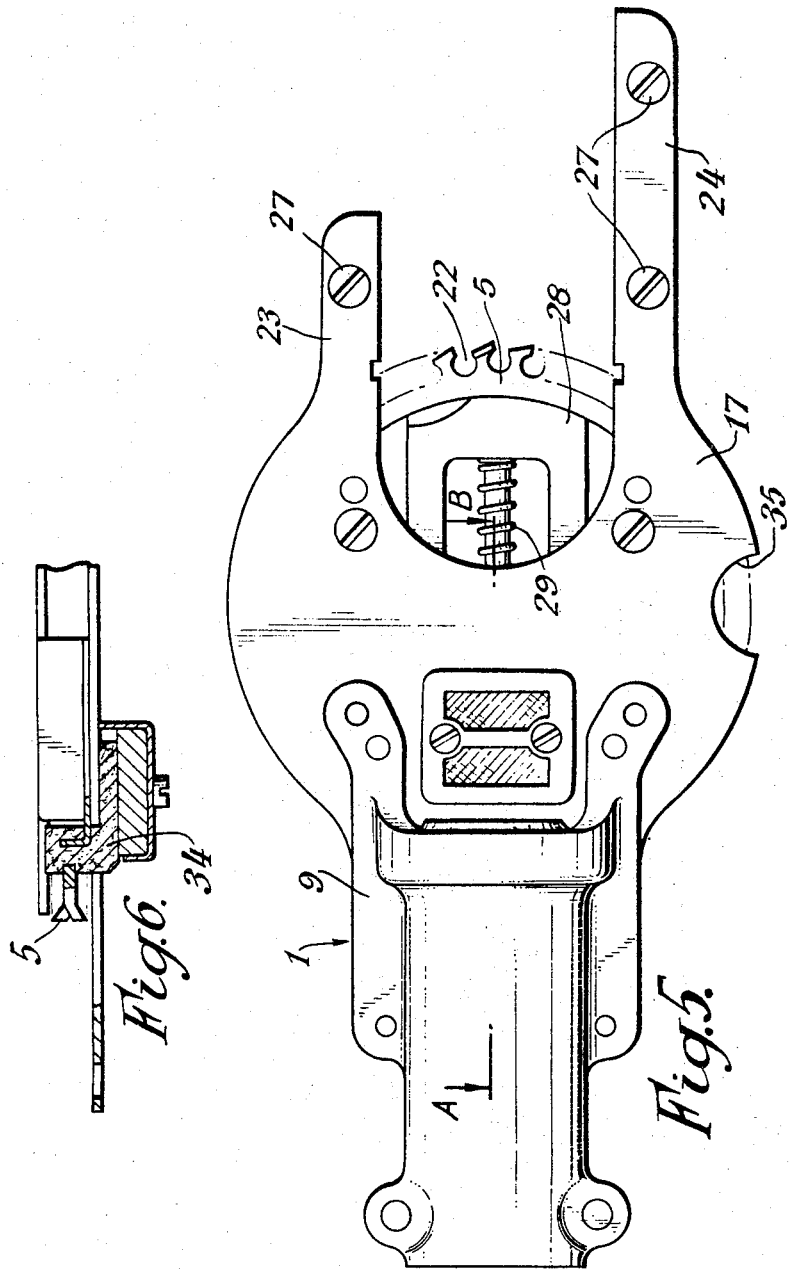

United States Patent Office 3,373,489
Patented Mar. 19, 1968

3,373,489
POWER DRIVEN PRUNING SAWS
Alonzo Roy Giles, Ipswich, England, assignor to G. & M. Power Plant Co. Limited, Ipswich, England, a British Company
Continuation of application Ser. No. 454,498, May 10, 1965. This application June 26, 1967, Ser. No. 649,053
Claims priority, application Great Britain, Aug. 19, 1964, 33,892/64
4 Claims. (Cl. 30—167)

ABSTRACT OF THE DISCLOSURE

A pruning saw for pruning branches of trees and the like comprised of driving means activated by manually operable trigger means mounted at one end of an elongated shaft; the shaft is coupled to the driving means at a first end thereof and is coupled to a driving pinion through a substantially rectangular shaped coupling; the pinion causes the rotation of a substantially annular shaped saw blade having substantially semi-circular openings adjacent each of the saw teeth which the pinion enters in driving the saw blade so as to clear any foreign matter collected therein. The annular shaped saw blade is mounted between covering plates whose rearward ends are adjacent the drive shaft and pinion and whose forward ends form a pair of cooperating arms of unequal length enabling the pruning saw to be positioned so that its longer extending end may rest against the branch to be sawed. The saw blade is driven in a direction so as to cause the branch being trimmed to bear against the longer arm so as to stabilize the pruning operation.

Positioned between the cover plate is a kerf-retaining blade reciprocally mounted so as to have its forward arcuate shaped end bearing against the inner periphery of the annular shaped saw blade; bias means are caused to bear against the kerf-retaining blade to urge it against the inner edge of the saw blade. Stop means provided at the rearward end of the kerf-retaining blade cooperate with stop blocks secured to the pruning saw cover plates to limit the forward motion of the kerf-retaining blade; a single biasing means is mounted along the longitudinal axis of the pruning saw assembly allowing the kerf-retaining blade to be moved rearwardly as a result of entering the cut made by the pruning saw in order to keep the cut portions of the branch being cut so as to prevent jamming of the pruning saw during the cutting operation.

---

This is a continuation of the application Ser. No. 454,498, filed May 10, 1965 and now abandoned.

The present invention relates to a power-driven tree trimming or pruning saw and particularly to a pruning saw adapted to be held by an operator so as to cut tree limbs and branches. The pruning saw is especially advantageous when cutting limbs and branches in an upward direction.

The saw of the invention is adapted to have its cutting head supported on a pole so that the operator may stand on the ground and cut the tree limbs and branches from below. The saw-carrying head of the saw is of such construction that it is simple and light but durable, and is of relatively small dimensions so that it may be thrust through narrow openings between branches. Moreover, the mounting of the saw blade makes it possible to cut close to the trunk of the tree. When the tree branch is cut in an upward direction by a conventional saw, the kerf cut in the branch tends to bind upon the body of the saw because the outer end of the branch sags as the cut deepens. The sagging of the branch not only tends to close the bottom end of the kerf in upon the saw blade, but also places the uncut fibres of the branch immediately above the saw blade in compression making them more difficult to cut.

The chief object of the invention is to evolve an improved construction of pruning saw which will be more efficient in operation than those previously proposed, and which can be more easily positioned relatively to the selected branch or limb which it is desired to sever.

A pruning saw in accordance with the present invention includes a saw blade in the form of an annular toothed ring and driven by means of a driving pinion having pin like teeth which enter recesses in the saw blade between the teeth, the saw blade being mounted in a casing one end of which is bifurcated to provide spaced limbs of unequal length and which are intended to straddle the branch or limb which is to be severed by that part of the saw's periphery situated between the two limbs, the longer limb enabling the saw to be located in its correct position upon the selected branch, the longer limb being rested on the branch during the cutting operation.

According to a further feature of the invention the driving pinion or spur wheel is attached to the driving shaft by means of a plate screwed to the pinion and having a square protuberance entering a square hole in the pinion, the protuberance having a square hole for the entry of the square end of the driving shaft, thereby relieving the screws of any tension.

Referring to the accompanying drawings:

FIGURE 1 is a side elevation of the complete pruning saw;

FIGURE 2 is a side elevation of the saw carrying head drawn to an enlarged scale;

FIGURE 4 is an inverted plan view;

FIGURE 5 is a view similar to FIGURE 2 but of the opposite side of the saw carrying head;

FIGURE 6 is a fragmentary section on the line A–B in FIGURE 5;

Figure 3:
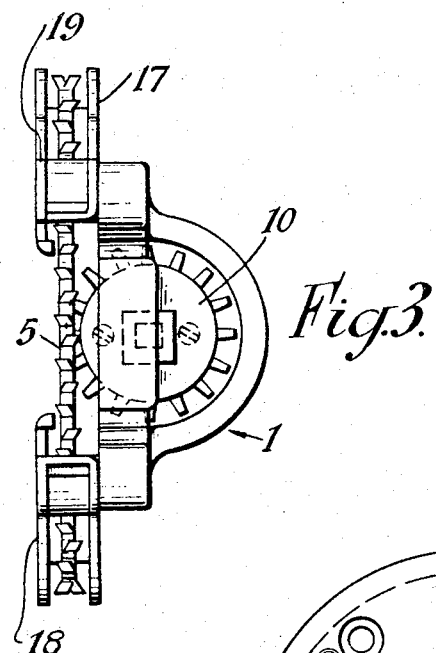
FIGURE 3 is an end view.
Figure 7:
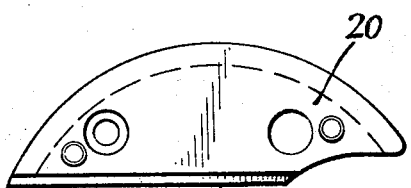
FIGURE 7 is a side elevation of the two saw guide blocks.
Figure 8:
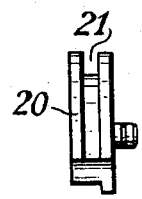
FIGURE 8 is an end elevation.

The pruning saw illustrated includes a saw carrying head indicated generally by reference numeral 1, the head being mounted on one end of a tubular pole 2, the opposite end of the pole carrying an electric driving motor 3 and trigger type switch 4 which drives the annular saw 5 through a flexible or other drive passing through the tubular pole, the switch 3 being associated with a handle 6 from which an electric lead 7 emerges for connection with a source of electric current supply such as a mobile generator.

It is proposed to manufacture the tubular pole in three lengths to suit individual requirements, the saw head and motor casing fitting any length of pole and as shown in the drawings being bored to receive the ends of the pole and being clamped in position thereon by associated clamping screws 8.

Figure 9:
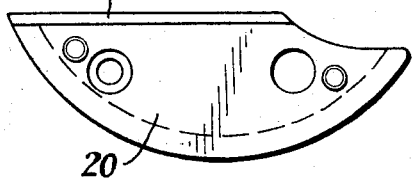
FIGURE 9 is a horizontal section showing the construction of the saw driving mechanism.

The part 9 of the saw head which fits the end of the pole contains a driving pinion 10 (see FIGURE 9) carried by a shaft 11 revolvably mounted in bearings 12 and 13, the two bearings being spaced apart by a spacing sleeve 14, bearing 13 being located in position by means of a pair of circlips 15.

The pinion and shaft are formed with a square hole 16 for the entry of a correspondingly shaped head on the end of the flexible or other drive.

The head 1 carries a part circular side plate 17 and two further part circular side plates 18 and 19, a pair of part circular saw guide blocks 20 being sandwiched between plate 17 and plates 18 and 19, blocks 20 being formed with peripheral grooves 21 forming guides for the inner edge of the saw 5.

The saw 5 takes the form of an annular toothed blade formed with recesses 22 between the teeth for the entry of the pinion teeth to drive the saw. The pinion teeth are of rounded spoke like formation and any chips picked up by the saw teeth are automatically removed by the pinion teeth from the recesses 22 as the pinion rotates. The recesses between the saw teeth are of part circular formation, the periphery of each recess having a length a little greater than half the circumference of a circle.

Plate 17 is formed with projections 23 and 24 of unequal length whilst plates 18 and 19 are formed with corresponding projections 23a and 24a.

Projections 23 and 23a and 24 and 24a are connected together in spaced relationship by plates 25 and 26 respectively and set screws 27 to form limbs.

In use the longer limb formed by parts 24 and 24a rest on the branch which is to be cut, the saw rotating in the direction of the arrow in FIGURE 2. Consequently the resultant of the force exerted by the saw teeth on the branch during the cutting operation will maintain the longer limb firmly in contact with the branch.

Slidably mounted between blocks 20 is a kerf-retaining blade 28 which is constantly pressed into the kerf by the coiled spring 29 located within a spring housing 30, the blade being formed with shoulders 31 which engage stops 31a so that the blade does not exert excessive outward radial pressure on the saw when the latter is commencing to cut the kerf in the branch. As the saw cuts progressively deeper into the branch or limb, the outer end of the branch sags so that the kerf is first pinched in at the bottom to contact the blade 28 and then squeezes the blade more and more tightly.

The kerf retaining blade has a thickness greater than that of the saw blade but less than the initial width of the kerf so that the kerf-retaining blade enters freely into the initial shallow kerf in the branch.

It will be assumed that before the cut has reached any great depth the branch will sag enough to cause the sides of the kerf to clamp the kerf retaining blade forcibly enough to cause the blade to overcome the force of the spring and remain stationary whilst the saw blade moves forwardly to complete the cut.

Plates 18 and 19 are formed with parallel lips 32 which in conjunction with similarly shaped lips 33 on the saw guide blocks 20 guide the kerf-retaining blade in its to and fro movement.

The head 1 carries a lubricant soaked pad 34 with which the inner edge of the saw blade engages as it rotates, lubricant being thus distributed over that part of the blade which engages the guide blocks.

The pruning saw described is of simple, light and durable construction having a head carrying the saw blade which is relatively narrow and which protects the saw blade from limb-sawing exposure except at a desired zone or zones, the saw head being sufficiently compact to enable the pruner to be thrust through narrow openings between branches and to cut close to the trunk of the tree.

Plates 17 and 19 are cut away at 35 to expose the saw blade and enable small diameter branches or twigs to be cut by the exposed part of the blade.

What is claimed is:
1. A pruning saw including:
   a saw-carrying head carried by a pole or handle, said head containing a pair of partially circular saw guide blocks, each formed with an annular groove;
   a saw blade in the form of an annular-tooth ring and driven by means of a driving pinion having pinlike teeth which enter recesses in the saw blades between the teeth, the saw blade being mounted in a casing, one end of which is bifurcated to provide spaced limbs which are intended to straddle the branch which is to be severed by the part of the saw's periphery situated between the two limbs;
   and a spring-urged kerf-retaining blade slidably mounted between two saw guide blocks for reciprocating movement;
   wherein the improvement comprises the kerf-retaining blade being formed with shoulders near the rearward end of said kerf-retaining blade;
   fixed stops secured to said saw guide blocks for engaging said shoulders to limit movement of the kerf-retaining blade to the inner edge of the saw blade;
   spring means mounted along the central axis of said kerf-retaining blade for normally urging said blade shoulders against said fixed stops;
   said spaced limbs being of unequal length and having their inwardly facing portions arranged substantially parallel to the longitudinal central axis of said kerf-retaining blade;
   said driving pinion rotating said saw blade so that the exposed portion of said saw blade between said limbs is driven toward the longer limb so that the longer limb will be held firmly in contact with the branch being cut.

2. The pruning saw of claim 1 wherein the saw-carrying head is detachably mounted on one end of a tubular pole, the pole's opposite end carrying a driving motor which drives the saw by means of a flexible or other drive means passing through the tubular pole.

3. The pruning saw of claim 2 wherein said driving means has a square-shaped member at its extremity fitting a similarly shaped recess in the driving pinion.

4. The pruning saw of claim 1 wherein said casing is adapted to cover and guide the marginal edges of said kerf-retaining blade.

References Cited
UNITED STATES PATENTS

| 2,713,717 | 7/1955 | Smithey | 30—167 |
| 2,770,036 | 11/1956 | Anderson | 30—167 |

FOREIGN PATENTS

| 1,081,658 | 6/1954 | France. |

OTHELL M. SIMPSON, *Primary Examiner.*

R. V. PARKER, *Assistant Examiner.*